United States Patent [19]

Stallings Jr. et al.

[11] Patent Number: 4,863,118
[45] Date of Patent: Sep. 5, 1989

[54] PASSIVE VENTING TECHNIQUE FOR SHALLOW CAVITIES

[75] Inventors: Robert L. Stallings Jr., Yorktown; Floyd J. Wilcox, Jr., Hampton, both of Va.

[73] Assignee: The United States of America as represented by the Administrator of the National Aeronautics and Space Administration, Washington, D.C.

[21] Appl. No.: 252,081

[22] Filed: Sep. 30, 1988

[51] Int. Cl.⁴ .......................... B64C 23/00; B64D 1/02
[52] U.S. Cl. .................................... 244/130; 244/137.4
[58] Field of Search ............... 244/137.1, 137.4, 118.1, 244/207–209, 198, 130; 84/1.51, 1.54

[56] References Cited

U.S. PATENT DOCUMENTS

| 1,817,089 | 8/1931 | McFadyen | 244/198 |
| 2,451,475 | 10/1948 | Diehl | 244/130 |
| 3,010,680 | 11/1961 | Kaplan | 244/207 |
| 4,552,360 | 6/1985 | Barnwell et al. | |
| 4,671,474 | 6/1987 | Haslund | 244/209 |
| 4,697,864 | 10/1987 | Hardy et al. | 244/137.4 |

Primary Examiner—Galen L. Barefoot
Attorney, Agent, or Firm—George F. Helfrich; John R. Manning; Charles E. B. Glenn

[57] ABSTRACT

A device for reducing drag and store separation difficulties caused by shallow cavities on aircraft in supersonic flight consisting of a group of hollow pipes the same length as the cavity. The pipes are attached to the cavity floor so as to allow air to flow through the pipes. This device allows air to flow through the pipes opposite to the direction of flow outside the pipes. This results in reduced drag and improved store separation characteristics.

3 Claims, 1 Drawing Sheet

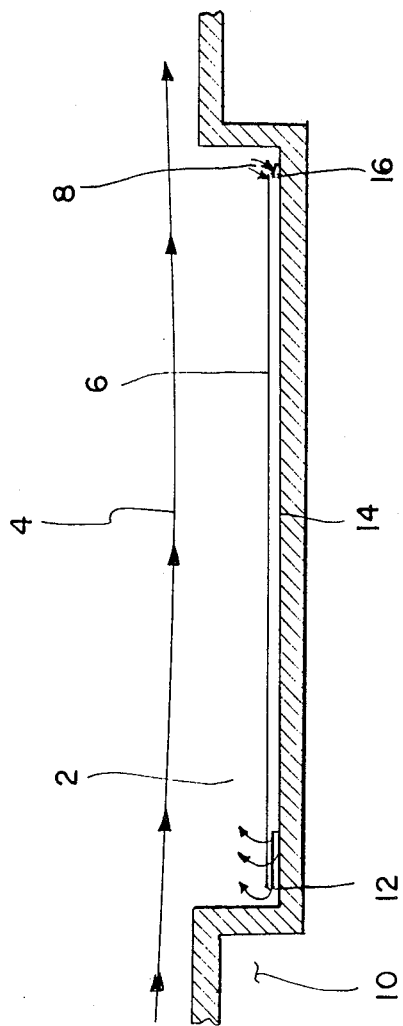

PASSIVE VENTING TECHNIQUE FOR SHALLOW CAVITIES

ORIGIN OF THE INVENTION

The invention described herein was made by employees of the U.S. Government and may be manufactured and used by or for the Government for governmental purposes without the payment of any royalties thereon or therefor.

CROSS REFERENCE TO RELATED APPLICATION

This application is related to our copending application Ser. No. 250,468, filed Sept. 28, 1986 entitled "Passive Venting Technique for Shallow Cavities".

TECHNICAL FIELD OF THE INVENTION

The present invention relates in general to shallow cavities on aircraft (for example, bomb and missile bays) and in particular to a device for reduction of drag and store separation difficulties caused by shallow cavities through the use of pipes set in the floor of the shallow cavity.

BACKGROUND OF THE INVENTION

During supersonic flight, cavities on aircraft affect the airflow across the surface of the aircraft depending on the length to height ratio of the cavity. If the length to height ratio is greater than about 12, the cavity is a shallow cavity and the airflow around the cavity is "closed cavity flow". If it is less than about 12, it is a deep cavity and the airflow is "open cavity flow". Although test results show that a length to height ratio of 12 is the approximate boundary between closed cavity and open cavity flow, this invention is also beneficial for length to height ratios between 9 and 12.

One difference between the two types of cavity flowfields is the pressure regions formed at the ends of the cavity in supersonic flight. A low pressure region is formed at the front of the cavity and a high pressure region is formed at the rear. In shallow cavities, these pressure areas are separated by a large enough distance that the high pressure region cannot vent to the low pressure region. This results in a large difference in the pressure between the two regions and leads to increased drag and to difficulty in separating stores (bombs or missiles) from the cavity.

These problems are not characteristic of deep cavities which demonstrate "open cavity flow". In deep cavities, the airflow is essentially undisturbed over the cavity. This is because the high and low pressure areas are not separated by a large distance and the pressure is essentially the same along the floor of the cavity. This means that the cavity causes very little drag and that there is no difficulty separating stores from the cavity.

Because it is not feasible for all cavities on aircraft to be deep cavities due to space and size limitations, the following are objects of the present invention.

An object of the present invention is to provide a device to cause shallow cavities on aircraft to behave like deep cavities during supersonic flight.

Accordingly, an object of the present invention is to provide a device which will cause the air in the high pressure region at the rear of a shallow cavity to be vented to the low pressure region in the front of the cavity.

SUMMARY OF THE INVENTION

According to the present invention, the foregoing and additional objects are obtained by providing hollow pipes which are set in the floor of a cavity on an aircraft. The length of the pipes is slightly less than the length of the cavity and the combined diameters of the pipes equal between 50 and 100% of the width of the cavity. The diameter of the pipes must be large enough to allow air to flow freely through them. The pipes should have as small a diameter possible so that the storage space in the cavity is maximized. A large diameter does not affect the usefulness of the invention. The pipes are shaped to allow air to enter and exit the ends. This allows air to flow from the high pressure region at the rear of the cavity to the low pressure region at the front of the cavity which occur during supersonic flight. Any means may be used to attach the pipes to the floor of the cavity so long as air is not blocked from entering and exiting the ends of the pipes. A shallow cavity is one with a length to height ratio greater than 12 although some beneficial results occur in cavities with a length to height ratio between 9 and 12.

BRIEF DESCRIPTION OF THE DRAWINGS

In the drawings:

FIG. 1 is a side view of a pipe mounted in a cavity.

DETAILED DESCRIPTION OF THE INVENTION

Referring to FIG. 1, hollow pipes (6) are provided. The length of the pipes (6) is 0 to about 20% less than that of the cavity (2) and the diameters of the pipes (6) combine to equal from between about 50 to 100% of the width of the cavity (2). The ends (12 and 16) of the pipes (6) are shaped in such a manner that air is allowed to enter (16) and exit (12) the pipes (6). The pipes (6) must be made from a material strong enough to withstand the difference between the air pressure inside the pipes (6) and that outside the pipes. A means to attach the pipes (6) to the floor (14) of the cavity (6) is provided. The pipes (6) must be of a large enough diameter to allow air to flow freely. However, because the area outside the pipes (6) is used for storage purposes, the pipes (6) must be designed to be of as small a diameter possible. Large diameter pipes do not negatively affect the usefulness of this invention, they only affect the amount of storage space left in the cavity.

The pipes allow air to flow in the direction (8) opposite to the air flow (4) on the surface of the aircraft (10). This is important in shallow cavities because during supersonic flight, a high pressure area is formed at the rear of a shallow cavity and a low pressure area is formed at the front. In shallow cavities, these two areas are too distant to allow the air in the high pressure area to flow to the low pressure area. This causes "closed cavity flow" which results in increased drag and store separation difficulties. Shallow cavities which have pipes set in the floor exhibit characteristics of "open cavity flow" such as reduced drag and the elimination of store separation difficulties.

EXAMPLE

A small scale of this invention has been tested in a wind tunnel. A cavity having a length to height ratio of 12 was used for test purposes. The cavity height was 2.447 inches and the length was 29.362 inches. Tests were conducted at Mach numbers ranging from 1.6 to 2.65. Similar results were obtained at the different Mach numbers. Semicircular copper pipes having a wall thickness of 0.035 inches, a radius of 0.25 inches and a length of 28.362 inches were attached to the floor of the cavity. The pipes were mounted in the cavity with both ends set a small distance away from the sides of the cavity. The end of each pipe at the rear of the cavity was cut diagonally from a point 0.5 inches from the end to allow air to enter. At the front of the cavity, air was allowed to exit through the end of each pipe as well as through a 0.035 inch high by 2.5 inch long slot in the side of each pipe adjacent to the floor of the cavity.

The results of this testing show that the pipe vents result in a modest improvement in the separation characteristics of stores dropped from the center of the cavity and a major improvement in the separation characteristics of stores dropped from the sides of the cavity.

What is claimed is:

1. A device for reducing drag and store separation difficulties caused by shallow cavities on aircraft in supersonic flight which comprises:
    a. a shallow cavity, which is defined as one having a length to height ratio greater than about 9,
    b. a group of hollow pipes whose length is between about 80 and 100% of the length of the cavity, whose combined diameters equal between about 50 and 100% of the width of the cavity and whose ends are shaped to allow air to enter and exit, where the pipes are constructed from a material strong enough to withstand a pressure difference between inside and outside the pipes, and
    c. a means to mount the pipes in the floor of the cavity such that the airflow within the pipes is parallel and in the opposite direction to the airflow outside of the pipes.
2. A device according to claim 1 where a shallow cavity is defined as one having a length to height ratio greater than about 12.
3. A device according to claim 1 where the pipes are mounted in a planar configuration.

* * * * *